Oct. 28, 1952 — H. B. CRAWFORD — 2,615,755
HOSE REEL
Filed June 7, 1949
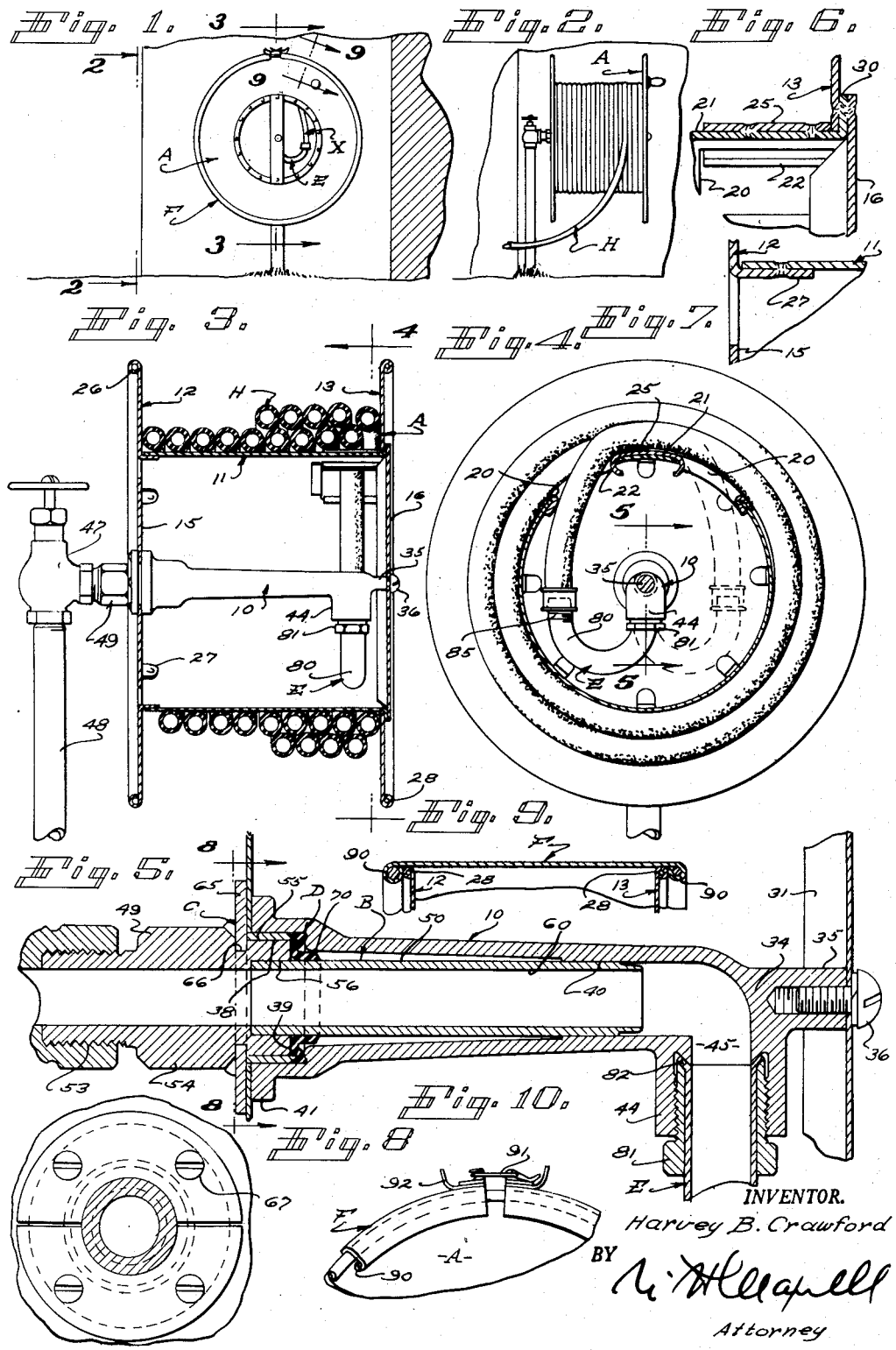
INVENTOR.
Harvey B. Crawford
BY
Attorney Patented Oct. 28, 1952

2,615,755

UNITED STATES PATENT OFFICE 2,615,755

HOSE REEL

Harvey B. Crawford, La Canada, Calif.

Application June 7, 1949, Serial No. 97,608

7 Claims. (Cl. 299—78)

This invention has to do with a hose reel and it is a general object of the invention to provide a simple, practical, improved reel or carrier suitable for application to a fluid supply line and serving to handle hose so that it can be readily operated between an extended and a reeled condition.

The present invention provides a structure of the general character referred to wherein the reel which carries the hose is of simple, inexpensive, practical construction. The reel has a drum of substantial size on which the hose is wound and it has inner and outer end flanges that confine the hose to the drum. The outer end flange projects outward from the drum leaving the outer end of the drum open so the interior of the drum is accessible. The inner flange extends inwardly from the drum and connects with the central hub which extends axially through the drum and has its outer end closed and attached to a cross arm that extends diametrically across the outer end of the reel. The hub is supported on a tubular spindle through longitudinally spaced bearings and the reel is retained on the spindle by a split collar. A lateral projection on the outer end portion of the reel hub has a port in communication with the interior of the hub and with the spindle. A pivoted fluid connection is carried by the lateral extension of the hub to be swung to discharge in either direction circumferentially of the reel and within the drum of the reel. The hose attaches to the said fluid connection and extends therefrom through either one of two circumferentially spaced openings to be wound upon the drum. A sealing means is carried in the hub of the reel to engage around and seal with an extending part of the spindle and a cover is provided to encase the reel between the peripheral portions of the flanges thereof when desired.

A general object of the present invention is to provide a reel construction wherein the reel element, per se, is of simple, inexpensive, practical construction and has a flange at its inner end that extends from the hub of the reel to the periphery thereof while the flange at the outer end is such as to project from the drum of the reel leaving the outer end of the drum open. By having the outer end of the reel open the shiftable fluid connection that is located within the drum is readily accessible so that a hose can be attached thereto with ease.

A further object of the present invention is to provide a hose reel of the general character referred to wherein the drum has circumferentially spaced openings for passing the hose from the interior of the drum to the exterior thereof, which openings are adjacent the outer end portions of the drum so that the end of the hose arranged through one of the openings is conveniently accessible through the open outer end of the drum of the reel.

Another object of the invention is to provide a structure of the general character referred to wherein the supporting spindle is of unique construction and effectively carries the reel through axially spaced bearings.

Another object of the invention is to provide a structure of the general character referred to wherein there is a sealing means acting between the hub of the reel and the supporting spindle which sealing means is secured or held in the hub by a bushing which serves as a bearing and has a lip that bears on the exterior of the spindle to effectively seal therewith.

The various objects and features of my invention will be fully understood from the following detailed description of a typical preferred form and application of my invention, throughout which description reference is made to the accompanying drawings, in which:

Fig. 1 is an end elevation of the structure provided by the present invention, showing it applied to a stand pipe and showing it viewed from the outer end where the drum of the reel is open, making the hose accessible and showing the cover applied to the reel. Fig. 2 is a view of the structure shown in Fig. 1 taken as indicated by line 2—2 on Fig. 1 and showing the cover removed. Fig. 3 is an enlarged longitudinal sectional view of the structure taken as indicated by line 3—3 on Fig. 1. Fig. 4 is a transverse sectional view taken as indicated by line 4—4 on Fig. 3. Fig. 5 is an enlarged longitudinal sectional view of a portion of the structure taken as indicated by line 5—5 on Fig. 4. Fig. 6 is an enlarged detailed sectional view taken at the outer end of the drum of the reel showing the manner in which that end of the drum is joined to the outer flange and to the cross arm that occurs at the outer end of the reel. Fig. 7 is a view similar to Fig. 6, showing the construction that occurs at the inner end of the drum where the drum is joined to the inner flange of the reel. Fig. 8 is a transverse sectional view taken as indicated by line 8—8 on Fig. 5. Fig. 9 is an enlarged detailed sectional view taken as indicated by line 9—9 on Fig. 1, and Fig. 10 is an enlarged detailed sectional view showing the manner in which the ends of the cover may be connected so that the cover is made secure on the reel.

The construction provided by the present invention involves generally a reel A carrying a hose H, a spindle B that supports the reel through the hub 10 thereof, means C retaining the reel A on the spindle B, sealing means D acting between the hub 10 of reel A and the spindle B, a shiftable fluid connection or conduit E carried by the hub 10 of the reel having the inner end of the hose H joined thereto, and a cover F applicable to the reel A.

The reel A is preferably a simple structure formed of sheet metal and in the form of the invention illustrated it involves, generally, a drum 11 which is of simple cylindrical form and on which the hose H is wound. It has an inner end flange 12 at one end of the drum and an outer end flange 13 at the outer end of the drum and it also involves a hub 10 which is rotated centrally within the drum with its inner end attached to an inward extension 15 of the inner end flange 12 and with its outer end attached to a cross arm 16 that extends diametrically of the drum at the outer end thereof.

The drum may vary widely in size and proportion it being preferred ordinarily that it be of such diameter as to carry a hose H without undue bending or distortion thereof and that it be proportioned substantially as shown in the drawings. In accordance with the present invention the drum 11 is provided with two circumferentially spaced hose passages or openings 20 which openings are preferably located adjacent or close to the outer end of the drum so that the end portion X of a hose inserted through one of the openings is readily accessible to a person reaching into the outer end portion of the drum 11. In the preferred construction there is a portion 21 of the drum that is located between the hose openings 20 and which, in effect, forms a bridge between the openings and supporting convolutions of the hose between the openings. In the preferred form of the invention inwardly projecting and preferably curved hose guiding lips 22 project from the edges of the bridge portion 21 to guide the end portion X of the hose as it passes between the interior of the drum and the exterior thereof. In the particular form of the invention illustrated the structure is such that the drum 11 may be of light or thin sheet metal, in which case it may be preferred to reinforce the drum in the region of the hose openings 20. In the drawings a reinforcing plate 25 is shown applied to the drum where the openings 20 thereof and the lips 22 are provided on the reinforcing plate 25 instead of being directly formed on the sheet which forms the drum 11. It is to be understood that the reinforcing plate 25 may be of any suitable weight and size and it may be secured to the body or sheet forming the drum 11 by any suitable means as, for instance, by welding or the like.

The inner end flange 12 with its extension 15 is preferably a flat disc of sheet metal with a central opening that passes or accommodates the mounting spindle B and with a periphery which is concentric with the axis of the reel and which is preferably rolled at 26, or otherwise stiffened, so that it retains the desired shape. In accordance with the preferred form of the invention the inner end flange 12 is fixed or secured to the inner end of the drum 11 by tabs or ears 27 which are formed on or bent from the plane of the end flange 12 to engage within the inner end of the drum 11. The ears 27 are joined or made fast to the drum 11 in any suitable manner, as for instance by welding, and it will be understood that in practice the ears may vary in size and circumferential spacing, as circumstances require.

The outer end flange 13 is joined to the outer end of the drum 11 and projects outwardly therefrom. The outer periphery 28 of flange 13 is the same size as that of the inner end flange 12 and may be rolled or otherwise stiffened as shown in the drawings. In the preferred form of the invention the flange 13 is joined to or made fast with the outer end of drum 11 by securing the flange 13 to a radially projecting lip 30 formed on the outer end of the drum 11. Suitable means may be provided for securing these parts together. For instance, they may be welded, as indicated in the drawings.

The hub 10 of the reel is located centrally in the drum and it is an elongate part that extends from the extension 15 of flange 12 to the cross arm 16 that extends diametrically across the outer end of the drum 11. The cross arm 16 forms a support for the outer end of the hub 10 and is preferably stiffened by a suitable rib 31. The ends of the cross arm may be joined to the lip 30 at the outer end of the drum 11 by any suitable means, as for instance by welding.

A socket 32 enters the hub 10 from the inner end of the reel to receive the spindle B and it extends a substantial distance into or through the hub but terminates short of the outer end of the hub so that the hub has an outer end wall 34. A boss 35 on the end wall 34 engages the cross arm 16 and is attached thereto by a suitable fastener 36.

In accordance with the present invention the socket 32 in the hub 10 is enlarged or counterbored at its mouth or at the inner end of the hub to carry a bearing part or bushing 38 and to form a rearwardly facing shoulder 39. A second finished or bearing part 40 is provided in the socket at a point somewhat spaced from the end 34.

The hub 10 is secured at the inner end of the reel to the extension 15 of flange 12 and in the case illustrated the hub is shown with a radially projecting flange 41 at its inner end which is joined to the part 15. At the outer end portion of the hub 10 between the wall 34 and the bearing portion 40 the hub is provided with a lateral extension 44 having a port 45 in communication with the socket 32.

The spindle B is provided for application to a fluid conduit, for instance, to a fitting 47 on the upper end of a stand pipe 48 and in the preferred form of the invention the spindle involves a head 49 that attaches to the fitting 47 and enters the reel and an extension 50 which is carried by the head 49 and which extends into the socket of the hub to be supported in the bearing 40.

The head 49 of the spindle has a threaded part 53 engageable with the fitting 47, a polygonal part 54 which carries the threaded part 53 and which projects rearwardly from the reel to be accessible at the inner end of the reel, and a reel engaging part 55 which enters the counterbore in the inner end of the hub to be rotatably supported in the bearing or bushing 38 carried in the counterbore. The extension 50 of the spindle may be a simple tubular part held or made tight in the part 55 of the head 49 by entering a bore 56 in part 55, and it extends forwardly into the socket 32 in the hub 10 to enter and to engage in the bearing part 40 provided in the hub. The extension 50 terminates short of the point where the port 45 joins the socket and a central longitudinal passage 60 is provided through the spindle from one end to the other so that fluid from fitting 47 flows freely through the spindle to discharge into the socket forward of the spindle extension 50 and to flow therefrom through the port 45.

Through the construction just described the reel A is rotatably supported on the spindle B through the spaced bearings at 38 and 40 and a free unobstructed fluid passage is provided from the fitting 47 to which the spindle is applied to the port 45 which conducts fluid from the hub.

The means C retaining the reel on the spindle preferably involves a part 65 carried by the reel at the upper end portion thereof to project into a recess or channel 66 provided in or around the head between the parts 54 and 55 thereof. In the form of the invention illustrated the part 65 is in the nature of a split collar secured to the inner end of the reel by suitable fasteners such as screws 67. Tht collar slidably operates in the annular channel 66 so that it does not interfere with free rotation of the reel on the spindle but positively prevents shifting of the reel in either direction axially of the spindle.

The sealing means D preferably involves a simple annular seal carried by the hub 10 to engage the spindle B. In the case illustrated the annular seal is arranged in the socket to be held between the bushing 38 and the shoulder 39 and it has a lip 70 which engages around the extension 50 of the spindle to face outwardly or toward the outer end of the reel, as clearly shown in Fig. 5 of the drawings. The parts are arranged and proportioned so that the sealing member is supported axially by the inner end of part 55 of the head 49.

The connection E serves to connect the hub 10 of the reel with the inner end portion X of the hose H and it is shiftable or rotatable so that it supports the end X of the hose in such position as to be led through either of the openings 20 in the drum of the reel. In the form of the invention illustrated the connection E is an arcuate or substantially semi-circular duct 80 having one end rotatably or swivelly connected to the lateral extension 44 of the hub while its other end is provided for connection with the end X of the hose.

In the particular case illustrated the end of the connection 80 which is joined with the hub extension 44 enters the hub extension to be retained therein by a threaded retainer 81. The retainer 81 engages a flange 82 on the end of the connection 80 that is located within the extension 44. In the preferred form of the invention the connection 80 extends through an angle of about 180° and its outer end is finished or provided for connection with the hose. For instance it may be threaded at 85 to receive a suitable hose coupling provided on the end of the hose. It is to be observed that the construction just described provides for rotation of the connection 80 about the axis of the extension 44 so that the extension can be freely or readily swung between the position shown in full lines in Fig. 4 and that shown in dotted lines in Fig. 4. In moving between these positions the threaded outer end of the connection 80 passes beneath the hub. The connection 80 is preferably formed of a simple tube and it is in full communication with port 45 so that fluid delivered to the port 45 is conducted to the end of the hose.

With the construction just described the hose can be wound onto the reel in either direction, as circumstances may require, and because of this the structure can be conveniently and advantageously used in various situations as for instance, in corners or in limited spaces where use of the structure would be limited or inconvenient if the hose had to wind onto the reel in one direction only.

It is to be noted that the curved or arcuate connection 80 carried by the extension or projection 44 of the reel hub is located within the drum of the reel at the outer end portion thereof, so that it is conveniently accessible for application of the hose thereto and for swinging between the two positions above described.

The cover F is applicable to the reel A to house or encase a hose H carried on the reel. In the preferred form of the invention the cover is a simple split ring formed of sheet metal or the like and it is such as to be applicable to the reel to extend around the reel and between the end flanges thereof, as shown in Figs. 1 and 9 of the drawings. In the case illustrated the sheet of metal out of which the cover is formed is rolled or is reinforced at its ends by beads 90 or the like and the ends of the cover are releasably coupled by a toggle fastener 91. In the particular case illustrated the two sections of the fastener 91 are carried on brackets 92 which are made fast to the ends of the cover, which brackets have projections that form handles or grips making the cover convenient to operate.

From the foregoing description it will be apparent that the structure provided by the present invention is simple and inexpensive of manufacture and it will also be observed that a hose can be conveniently attached to the connector 80 of the reel which is accessible through the open outer end of the drum 11 of the reel. Further, it is to be observed that the hose is passed from the interior of the drum to the exterior thereof without kinking or excess bending and that the hose will neatly wind on the drum between the ends or end flanges. The reel turns freely on the supporting spindle so that it can be operated either to wind the hose onto the reel or to allow the hose to be withdrawn from the reel, and under all conditions of operation fluid such as water from the standpipe 48 is handled through the spindle B, the hub 10 and the connection E so that it is delivered to the hose without leakage.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In a hose carrying structure of the character described, a hose reel including a cylindrical drum with circumferentially spaced openings and open at its outer end and having annular hose retaining flanges at both ends and a central hub within the drum and substantially coextensive therewith axially of the reel, a fixed, unrestricted, fluid conducting spindle entering the hub from its inner end and being the sole support rotatably carrying the reel and opening into the hub at the outer end portion thereof, and a substantially U-shaped fluid conducting hose connector connected to the hub outward of the spindle and having its inner end laterally disposed relative to the hub and having its outer end circumferentially disposed within the drum and receiving the hose, said outer end of the connector being accessible through the open outer end of the drum, the inner end of the connector being rotatably connected to the hub for shifting of the connector to face the outer end of the connector toward either of the spaced openings in the drum.

2. In a hose carrying structure of the character described, a hose reel including a cylindrical hose carrying drum, annular flanges concentric with the drum and projecting radially outward from the ends of the drum, a hub spaced from and located centrally within the drum, an extension of the flange at the inner end of the drum extending radially inward from said end of the drum and carrying the inner end of the hub, and an elongated arm extending across the outer end of the drum diametrically thereof and carrying the outer end of the hub, an unrestricted tubular spindle entering the hub from the inner end of the reel and opening into the outer end portion of the hub and being the sole support rotatably carrying the reel, a valve connected to the spindle at the exterior of the reel adjacent the inner end thereof, and means connecting the hose to the hub within the drum and accessible through the opening outer end of the drum.

3. In a hose carrying structure of the character described, a hose reel including a cylindrical drum having flat annular hose retaining flanges fixed to both ends and a central hub within the drum and axially coextensive therewith, an unrestricted tubular spindle entering the hub from its inner end and being the sole support rotatably carrying the reel, the spindle having an outer end opening into the hub and having an inner end portion immediately adjacent the inner end of the reel and adapted to receive a valve, sealing means within the drum carried by the hub and engaging the spindle, and means connecting the hose to the hub within the drum and accessible through the open outer end of the drum.

4. In a hose carrying structure of the character described, a hose reel including a cylindrical drum open at its outer end and having hose retaining flanges at both ends and a central hub within and axially coextensive with the drum, a spindle entering the hub from one end and being the sole support rotatably carrying the reel, means holding the reel against axial movement in either direction on the spindle including a collar on the inner end of the reel with a portion projecting radially inward and operating in an annular outwardly opening channel in the exterior of the spindle, and means connecting the hose to the hub within the drum and accessible through the open outer end of the drum.

5. In a hose carrying structure of the character described, a hose reel including a cylindrical drum open at its outer end and having hose retaining flanges at both ends and a central hub within the drum, a spindle entering the hub from its inner end and being the sole support rotatably carrying the reel, the spindle having an exposed inner end portion immediately adjacent the inner end of the reel and adapted to connect to a valve, sealing means carried by the hub within the drum and engaging the spindle, means connecting the hose to the hub within the drum and accessible through the open outer end of the drum, and a bearing between the hub and spindle, the hub having a counterbore at its inner end carrying the spindle and the spindle engaging and retaining the sealing means.

6. In a hose carrying structure of the character described, a hose reel formed completely of a cylindrical drum with circumferentially spaced openings therein, annular flange plates fixed to the ends of the drum, the flange plate at the inner end of the drum having an extension closing the inner end of the drum, a central hub having its inner end attached to said extension at the inner end of the drum, and a diametrically disposed cross arm carried by the outer end of the drum and attached to the outer end of the hub, there being a socket entering the hub from the inner end of the reel and terminating inward of the arm, a spindle entering the socket and forming the sole support rotatably carrying the reel, the outer end of the drum being open, and means connecting the hose to the hub within the drum and accessible through the open outer end of the drum, said means including a substantially U-shaped tubular connector with one end disposed transversely of the hub and swivelly connected thereto and having its other end faced circumferentially within the drum and receiving the hose, said other end of the connection being adapted to be faced toward one or the other of the openings in the drum.

7. In a hose carrying structure of the character described, a hose reel formed completely of a cylindrical drum, flat annular end flange plates fixed to the ends of the drum, the flange plate at the inner end of the drum having an extension closing the inner end of the drum, a central hub axially coextensive with the drum and having its inner end attached to said extension at the inner end of the drum, and a cross arm carried by the outer end of the drum and extending across and attached to the outer end of the hub, there being a socket entering the hub from the inner end of the reel and terminating inward of the arm, a spindle entering the socket and forming the sole support rotatably carrying the reel, the outer end of the drum being open, and means connecting the hose to the hub within the drum and accessible through the open outer end of the drum, said means including a U-shaped tubular connector with one end disposed transversely of the hub and swivelly connected thereto for rotation through 180° and having its other end faced circumferentially within the drum to selectively face one of the spaced openings in the drum and receiving the hose.

HARVEY B. CRAWFORD.

REFERENCES CITED

The following references are of record in the file of this patent:

UNITED STATES PATENTS

| Number | Name | Date |
| --- | --- | --- |
| 988,766 | Frigon | Apr. 4, 1911 |
| 1,165,277 | Munson | Dec. 21, 1915 |
| 1,244,818 | Wirt | Oct. 30, 1917 |
| 1,573,439 | Bedford | Feb. 16, 1926 |
| 1,886,207 | Marshall et al. | Nov. 1, 1932 |
| 1,982,610 | Harris | Nov. 27, 1934 |